United States Patent
Bosonetto et al.

(10) Patent No.: US 11,254,038 B2
(45) Date of Patent: Feb. 22, 2022

(54) INJECTION UNIT, WITH CLOSURE PIN, FOR THE INJECTION MOULDING OF PLASTIC MATERIAL, WITH CAPACITY TO RECOVER THERMAL DILATATIONS AND AVOID LEAKAGE OF THE PLASTIC MATERIAL

(71) Applicant: THERMOPLAY S.P.A., Pont Saint Martin AO (IT)

(72) Inventors: Guido Bosonetto, Pont Saint Martin AO (IT); Juergen Wilhelm Emich, Gross Zimmern (DE)

(73) Assignee: THERMOPLAY S.P.A., Pont Saint Martin AO (IT)

( * ) Notice: Subject to any disclaimer, the term of this patent is extended or adjusted under 35 U.S.C. 154(b) by 71 days.

(21) Appl. No.: 16/629,122

(22) PCT Filed: Jul. 8, 2018

(86) PCT No.: PCT/IT2018/050126
§ 371 (c)(1),
(2) Date: Jan. 7, 2020

(87) PCT Pub. No.: WO2019/008616
PCT Pub. Date: Jan. 10, 2019

(65) Prior Publication Data
US 2020/0290252 A1    Sep. 17, 2020

(30) Foreign Application Priority Data
Jul. 7, 2017 (IT) .................. 102017000076433

(51) Int. Cl.
*B29C 45/23* (2006.01)
*B29C 45/28* (2006.01)
*B29C 45/74* (2006.01)

(52) U.S. Cl.
CPC ........ *B29C 45/231* (2013.01); *B29C 45/2806* (2013.01); *B29C 45/74* (2013.01)

(58) Field of Classification Search
CPC ....... B29C 45/20; B29C 45/26; B29C 45/231; B29C 2045/1735; B29C 2045/1739; B29C 2045/2777; B29C 2045/2806
See application file for complete search history.

(56) References Cited

U.S. PATENT DOCUMENTS

| 5,022,846 A | 6/1991 | Schmidt |
| 6,599,116 B2 | 7/2003 | Lee et al. |

(Continued)

FOREIGN PATENT DOCUMENTS

| CN | 102452154 A | 5/2012 |
| CN | 103038046 A | 4/2013 |

(Continued)

OTHER PUBLICATIONS

Search Report for Chinese Application No. 2018800525415 dated Mar. 17, 2021.

(Continued)

*Primary Examiner* — Joseph S Del Sole
*Assistant Examiner* — Thu Khanh T Nguyen
(74) *Attorney, Agent, or Firm* — GrowIP Law Group LLC

(57) ABSTRACT

Injection unit for injection molding of plastic material including: an injection nozzle; a closure pin; and a guide and cooling assembly, interposed between the back driving plate and the hot distribution plate, in turn comprising: a guide and seal element for guiding the axial motion of the closure pin; a cooling ring; and pressure means configured to press the cooling ring directly and against the back driving plate; wherein the guide and seal element is slidably coupled, at an upper end, with a central hole of the cooling ring, and is fixed integrally, at the other end, to the hot distribution plate;

(Continued)

and the cooling ring is able to slide laterally with respect to the back driving plate to recover the differences in thermal expansion between the hot distribution plate and the back driving plate and to transmit heat from the guide and seal element towards the back driving plate.

9 Claims, 6 Drawing Sheets

(56) References Cited

U.S. PATENT DOCUMENTS

| | | | |
|---|---|---|---|
| 7,753,676 | B2 | 7/2010 | Babin et al. |
| 8,728,378 | B2 * | 5/2014 | Lee .................. B29C 45/281 |
| | | | 264/328.1 |
| 2003/0143298 | A1 | 7/2003 | Blais |
| 2004/0185135 | A1 | 9/2004 | Colonico |
| 2008/0187617 | A1 | 8/2008 | Barnett et al. |

FOREIGN PATENT DOCUMENTS

| | | |
|---|---|---|
| CN | 104943081 A | 9/2015 |
| CN | 102770257 B | 11/2015 |
| CN | 205416236 U | 8/2016 |
| EP | 0907486 B1 | 8/2000 |
| EP | 1223018 B1 | 7/2002 |
| EP | 1178881 B1 | 4/2003 |
| EP | 1790455 A2 | 5/2007 |
| EP | 1825988 B1 | 9/2011 |
| EP | 2298529 B1 | 5/2018 |
| WO | WO2011119791 A1 | 9/2011 |

OTHER PUBLICATIONS

International Search Report (ISR) for PCT/IT2018/050126 dated Oct. 10, 2018, 3 pages.
International Preliminary Report on Patentability dated Jun. 17, 2019, 16 pages.
Chinese Application No. 201880052541.5, Second Office Action and Search Report dated Oct. 26, 2021.

* cited by examiner

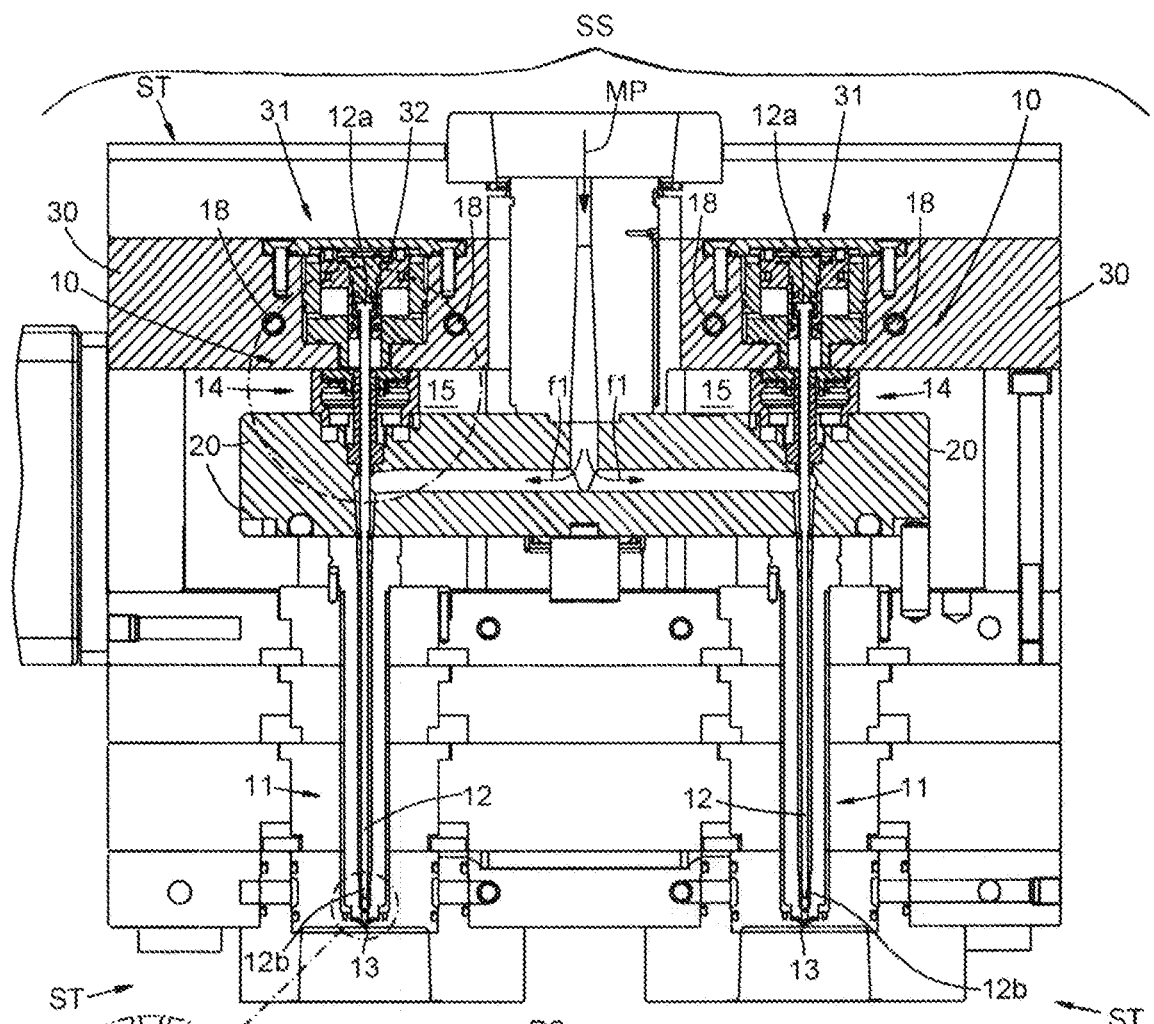
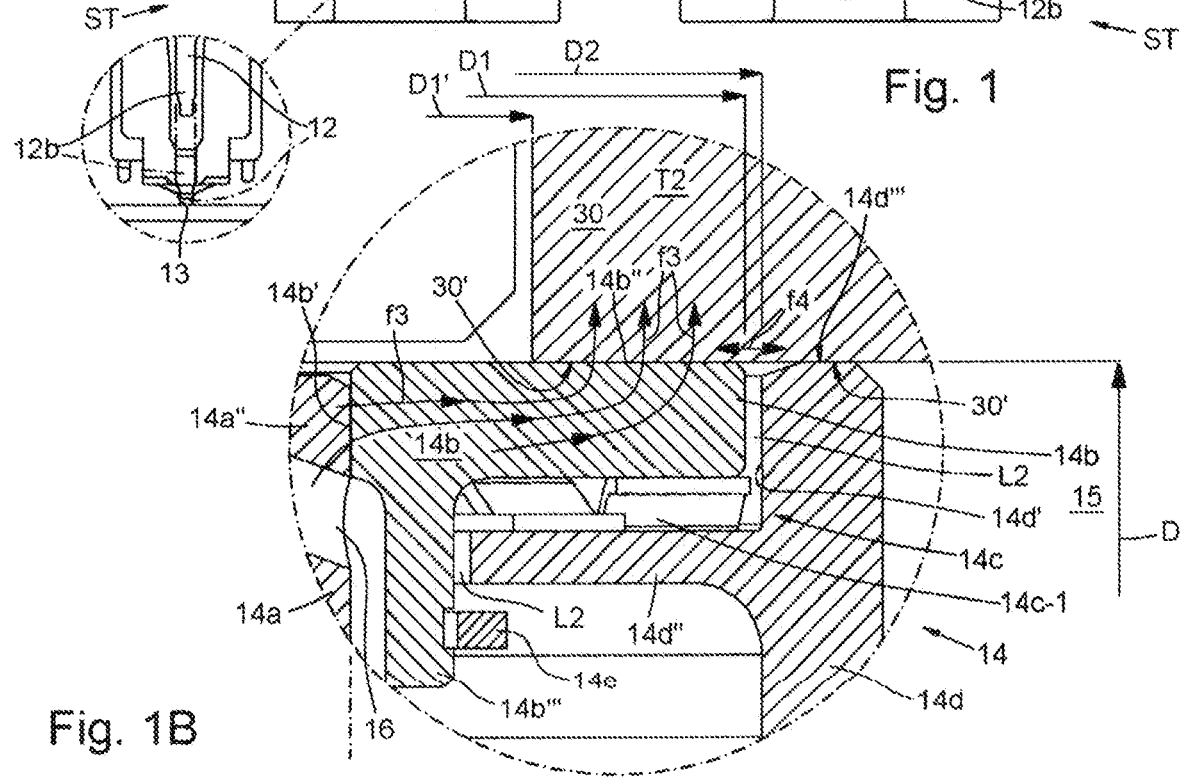
Fig. 1
Fig. 1B

INJECTION UNIT, WITH CLOSURE PIN, FOR THE INJECTION MOULDING OF PLASTIC MATERIAL, WITH CAPACITY TO RECOVER THERMAL DILATATIONS AND AVOID LEAKAGE OF THE PLASTIC MATERIAL

CROSS-REFERENCE TO RELATED APPLICATIONS

This application claims the benefit of priority of international PCT Patent Application No. PCT/IT2018/050126, filed on Jul. 8, 2018, that in turn claims priority to Italian Patent Application No. IT 102017000076433, filed on Jul. 7, 2017, the contents of which are hereby incorporated by reference in their entirety.

TECHNICAL FIELD

The present disclosure relates in general to the plastic injection moulding sector, and more particularly it relates to an injection unit or assembly, according to the preamble of the first independent claim, which exhibits better and superior performances than those currently in use and offered in the market, such as an improved ability to recover and absorb the different thermal expansions of the parts of the wider injection system in which the injection unit of the invention is integrated, to reduce the stresses acting on the same injection unit, and to further avoid leakage and losses of the plastic material in the molten state supplied to the injection unit.

More precisely, as it will become clear from the following description, the injection unit of the invention is specifically of the type comprising a closure rod or pin or needle able to slide axially in a respective bush or guide element to selectively open and close an injection hole, and is associated with a hot distribution plate, suitable to distribute and supply the plastic material in the molten state to the injection unit, and with a control plate, which houses the means for controlling the axial motion of the closure pin, wherein advantageously the injection unit has the capability to avoid, in its operation, both that the closure pin is subjected to dangerous stresses due to the different thermal expansion of the distribution plate, at a higher temperature, and of the control plate, at a lower temperature, and that high temperatures in the region of the guide bush of the closure pin are at the origin of leakage, through the same guide bush, of the plastic material, in the molten state, that is fed by the hot distribution plate to the injection nozzle.

The disclosure also concerns a spacer and guide assembly adapted to separate, in a mould for injection moulding of plastic material, a hot distribution plate and a control plate, associated with one or more injection groups or units interposed between them, and to guide an axially movable rod or pin, included in each injection unit, wherein the spacer and guide assembly has the capacity both to recover, during the mould operation, the different thermal expansions of the hot distribution plate and of the control plate, so as to prevent the closure pin of the injection unit being subjected to dangerous stresses which might impair its regular operation, both to effectively evacuate and transmit the heat from a guide bush of the closure pin, at a higher temperature, to the control plate, at a lower temperature, so as to avoid that in the area of such guide bush of the closure pin there are reached temperatures too high which could favour leakage and losses to the outside of the molten plastic material supplied to the injection unit by the hot distribution plate, and also to recover any possible errors and structural inaccuracies of centering in the assembly of the various parts, including the hot distribution plate and the control plate, of which the mould is composed.

BACKGROUND ART

The hot-runner or hot-channels injection moulding technique of plastic material provides that the plastics material in the molten state is fed to one or more nozzles or injection units, for being then injected into a mould so as to form and mould a piece of plastic.

In particular, the plastic material in the molten state is distributed and fed to the various injection units by means of a distribution plate, often called with the term "manifold", which defines a network or system of channels in which the plastic material, in the molten state, flows and runs to feed the various injection units.

As suggested by the name of this injection moulding technique, the channels of this network formed inside the distribution plate are kept "hot", that is at a certain temperature, by means of suitable heating means such as for example electric resistors incorporated in the distribution plate and arranged adjacent to the respective channels which convey and distribute the flow of the plastic material, in the molten state, to the various injection units.

In this way, the plastic material is prevented from solidifying in the channels of the distribution plate and thereby obstructing them, especially during periods of stasis, between one injection cycle and the next, when the plastic material in the molten state remains stationary and therefore motionless, without flowing, in the channels formed in the distribution plate.

Also the injection units which receive the plastics material in the molten state from the distribution plate can incorporate suitable electrical resistors which have the function of keeping them "hot", so as to prevent the plastic material from solidifying inside the same injection unit and therefore allow a correct and regular injection of the plastic material into the mould to form the piece.

In this hot-runner injection moulding technology the various injection units can be of the type comprising a closure pin, movable axially between two operating positions, having the function, when it is arranged in such operating positions, to selectively open or close an injection hole, also called "gate", so as to enable or not the flow and injection of the plastic material, in the molten state, into the mould to form the moulded piece of plastic.

The closure pin of each injection unit is in turn suitably guided and is able to slide, in its axial motion between the two operating positions for opening and closing the injection hole, into a bush or guide element, which often acts also as a sealing element for retaining the molten plastic material fed to the injection nozzle by the distribution plate and therefore preventing this plastic material from leaking to the outside of the injection nozzle.

In this form of the hot-runner injection moulding technology, the injection nozzles, each including a closure pin, are usually associated, in addition and other than with a distribution plate having the function, as already specified, of distributing and feeding the material plastic in the molten state to the various injection nozzles, also with a support or command or control or driving plate, sometimes even called "back plate", which houses the means, usually constituted by pneumatic or hydraulic pistons, which control and drive the axial motion of the closure pin of each injection unit to selectively open and close the respective injection hole.

These two distribution and control plates, since being subjected in the respective operation at very different temperatures, with the distribution plate, inside which the plastic material flows in the fluid state, at a higher temperature, even more than 200° C., and with the control plate, which is not crossed by the plastic material in the fluid state and is often associated with a cooling circuit, at a lower temperature, for example of 25° C., are separated by a space of separation or interspace suitable to allow these two plates, in the operation, to deform and expand thermally relative to each other, in particular in the sense of their extension, so as not to generate dangerous stresses, in the injection units, which might endanger the regular and correct injection of the plastic material into the mould by the injection units.

Therefore, a first problem that arises in the hot-runner injection moulding technology with the injection nozzles including a closure pin is that of recovering and compensating, i.e. effectively absorbing, the different thermal deformations and expansions of the hot distribution plate and the control plate with which the various injection units are associated, that occur in the operation of the wider moulding system of which the injection units are part and in which they are integrated, in order to avoid that, because to these different thermal deformations and expansions of the hot distribution plate and the control plate, the injection units as a whole and more particularly the closure pin of each single injection unit are subjected to dangerous stresses which might impair the regular operation for controlling the flow of the plastic material in the molten state towards the mould.

Still, a second further problem that always arises in the hot-runner injection moulding technology characterized by injection nozzles including a closure pin is to achieve a good evacuation and transmission of heat from the bush or guide element, in which the closure pin extends and slides axially and which often acts also as a sealing element for the plastic material in the molten state supplied to the injection nozzle, so as to limit the temperature in this area, and therefore avoid that in the guide bush the temperature values are too high which would have the effect of reducing its ability to operate as a sealing element and therefore could cause leakage, through the same guide bush, of the plastic material in the molten state supplied by the hot distribution plate to the injection nozzle.

The solutions currently offered by the known technique to face and solve, directly or indirectly, the aforementioned problems are multiple and based on different approaches.

For example, it is mentioned the solution proposed by patent document EP 1 790 455 B1 which consists in exploiting the pressurized air, which is used to operate a pneumatic piston which in turn controls the axial motion of the closure pin between the open and closed positions of the injection hole, also to evacuate heat from the area of the guide bush of the closure pin.

A similar solution is also that described in the patent EP 1 178 881 B1, in the name of the Applicant, according to which the flow of air which feeds the pneumatic piston which controls the axial motion of the closure pin is also provided for lapping the area of the guide the same closure pin, and therefore to cool this area.

The document WO 2011/119791 A1 proposes instead a different solution, in order to evacuate heat from the region of the injection nozzle, based on a cooling block or device, in turn comprising within it a cooling channel in which flows a cooling fluid, wherein this cooling device is arranged between a piston which controls the axial motion of the closure pin of the injection unit, and a hot distribution plate, and is associated with a plate, adapted to transmit heat, which is pressed against and cooperates with a surface of the control plate housing the piston which commands the closure pin.

The U.S. Pat. No. 7,753,676 B2 in turn describes a solution comprising a guide bush of the closure pin, having a thin wall adapted to be compressed and consequently to deform due to the pressure of the plastic material in the molten state which is supplied by the hot distribution plate, so as to close on the closure pin and therefore increase the sealing capacity of the guide bush against possible leakages to the outside and losses of the plastic material in the molten state.

The solution proposed by the document EP 1 223 018 B1 provides for thermally insulating, by means of a plate crossed by a channel in which a cooling fluid flows, the area of a cylinder, for actuating the closure pin of the injection unit, from the area of the hot distribution plate, so as to prevent the actuation cylinder being exposed to the high temperature of the hot distribution plate.

The solution proposed by document U.S. Pat. No. 5,022,846 provides instead a guide bush of the closure pin having a flanged portion which is pressed against a front surface of the control plate which houses the cylinder with the control piston which commands the reciprocating movement of the closure pin, whereby the guide bush, in addition to seal the closure pin, performing a reciprocating motion, and therefore avoid that the molten plastic material supplied by the hot distribution plate is leaking and emerging from the area of the injection unit, also forms a part of the cylinder that houses the piston which controls the axial movement of the closure pin.

Document U.S. Pat. No. 6,599,116 B2 proposes an injection unit for moulding plastic material, wherein the piston which controls the reciprocal axial motion of the closure pin and the head of the closure pin are coupled with a certain clearance, in order to avoid that the different thermal expansions of the hot distribution plate, which feeds the plastic material in the molten state to the injection unit, and of the control plate, which houses the piston which commands the closure pin, produce in the operation of the injection unit significant lateral loads acting on the closure pin.

Still, the document US 2008/0187617 A1 proposes a special guide bush of the closure pin, movable axially, which guide bush is shaped so that, when it is subjected to the pressure of the plastic material in the molten state supplied by the hot distribution plate, deforms radially and along its longitudinal extension in such a way as to press radially against the closure pin and therefore effectively reduce leakage, between the guide bush and the closure pin, of the molten plastic material supplied by the hot distribution plate.

Reference is also made to document EP 0 907 486 B1 which describes a hot runner assembly for the co-injection moulding of plastic material, comprising a closure rod and two blocks along which the closure rod extends, wherein the two blocks are arranged between a hot distribution plate and a control plate and are separated by an intermediate element made of a material with low heat conductivity, and wherein these two blocks are pressed against each other by elastic means, consisting of a plurality of disk springs, which allow the two blocks to thermally expand axially in the operation of the co-injection moulding assembly.

At last it is mentioned patent document CN 205 416 236 U which discloses an injection unit for injection of plastic material comprising a guide sleeve for guiding a valve needle and a cylindrical body which is inserted on the guide sleeve, wherein the cylindrical body is associated with two heat conducting flaps which are in contact with the needle driver.

However, the various solutions offered by the known art, such as those mentioned above and briefly commented on, do not appear, at least in general, completely satisfactory, and all of them one more and one less are affected by limits and drawbacks, so that these known solutions leave room for further improvements.

Moreover, as a further limit of the current technique, it should be noted that the known solutions appear to require, in general, a very precise construction and compliance with very narrow manufacturing tolerances, with corresponding manufacturing costs that are not negligible, in order to ensure that there are not problems because of constructive inaccuracies, in the assembly phase of the moulding system, including the hot distribution plate and the control hot plate, in which the injection units are integrated

SUMMARY

Therefore, a first object of the present disclosure is to provide an injection unit or group or assembly, for injection moulding of plastic material, of the specific type comprising a closure pin or rod or needle, also associated with a hot distribution plate having the function of feeding the plastic material in the molten state to the injection unit, and with a control plate which houses the control means for controlling the axial motion of the closure pin, wherein the injection unit exhibits improved characteristics and performances with respect to the injection units already known and in use in the art, and in particular is suitable to effectively recover the different thermal expansions and deformations of the hot distribution plate and the control plate, with which the injection unit is associated, which occur in the operation of the injection unit, so as not to generate dangerous tensions and stresses, in particular on the closure pin of the injection unit, which could affect the correct and regular operation of the injection unit.

A second object of the present disclosure, however linked to the first one, is that of realizing an injection unit or group, for injection moulding of plastic material, still comprising a closure pin and always associated with a hot distribution plate, having the function of feeding the plastic material in the molten state to the injection unit, and with a control plate, which houses the control means for controlling the axial motion of the closure pin included in the injection unit, wherein the injection unit allows limiting the temperature in the region of a guide bush, of the closure pin, which also acts as a sealing element for the molten plastic material supplied by the hot distribution plate, so as to prevent such plastic material from leaking to the outside of the injection group.

A further third object of the present disclosure is also that of providing an injection unit for injection moulding of plastic material, still of the type comprising a closure pin, wherein the injection unit is adapted to be easily and quickly assembled in a wider moulding system including a hot distribution plate and a control plate associated with the injection unit, and in particular, during this assembling, is suitable to recover possible errors in the construction and centering of the parts to be assembled together.

The aforesaid objects can be considered as fully achieved by the injection unit or unit, for injection moulding of plastic material, having the features recited by the first independent main claim.

Particular embodiments of the injection unit or assembly of the invention are defined in the dependent claims.

The injection unit or assembly of the invention offers several important advantages, some already before illustrated, among which the following ones are cited for example:

an effective and efficacious evacuation and transmission of heat from the area of the bush or guide element which guides and through which the closure pin extends axially, during operation of the injection unit, so as to avoid excessive temperatures in this area causing leakage and losses of the plastic material, in the molten state, which is fed to the injection unit by the hot distribution plate;

effective sealing against any leakage, to the outside of the injection unit, of the plastic material in the molten state supplied by the hot distribution plate;

realization of optimal thermal conditions in the various regions of the injection unit, during its operation, so as to allow a correct injection of the plastic material into the mould;

absence of lateral forces and stresses, typically caused by the different thermal expansions of the hot distribution plate and of the control plate, in the operation of the injection unit, acting on the closure pin and such as to negatively affect its operation;

less wear over time and consequently longer life of the closure pin, with positive effects on the maintenance cost of both the injection unit and the mould in which the injection unit is incorporated;

great versatility, that is possibility to use, for moulding by injection the plastic pieces, a wide range of plastic materials in a corresponding wide moulding temperature range;

easy and quick assembly of the moulding system including the injection unit, with recovery, in this assembling, of any errors and constructive inaccuracies of the parts constituting the moulding system which has to be mounted.

BRIEF DESCRIPTION OF DRAWINGS

These and other objects, features and advantages of the present disclosure will be clear and evident by the following description of an embodiment thereof, provided purely by way of example with reference to the accompanying drawings, in which:

FIG. 1 is a partial and sectional view of a mould which incorporates at least one injection unit, according to the disclosure, for injection moulding of plastic material, according to a first embodiment thereof, wherein the injection unit is associated with a hot distribution plate and with a control plate or back driving plate to recover the different thermal expansions of these two plates and to avoid any leakage of the plastic material to the outside of the injection unit;

FIG. 1B is a view, in an enlarged scale, of an area indicated with a dot-dashed circle.

DETAILED DESCRIPTION

Figure 1A:
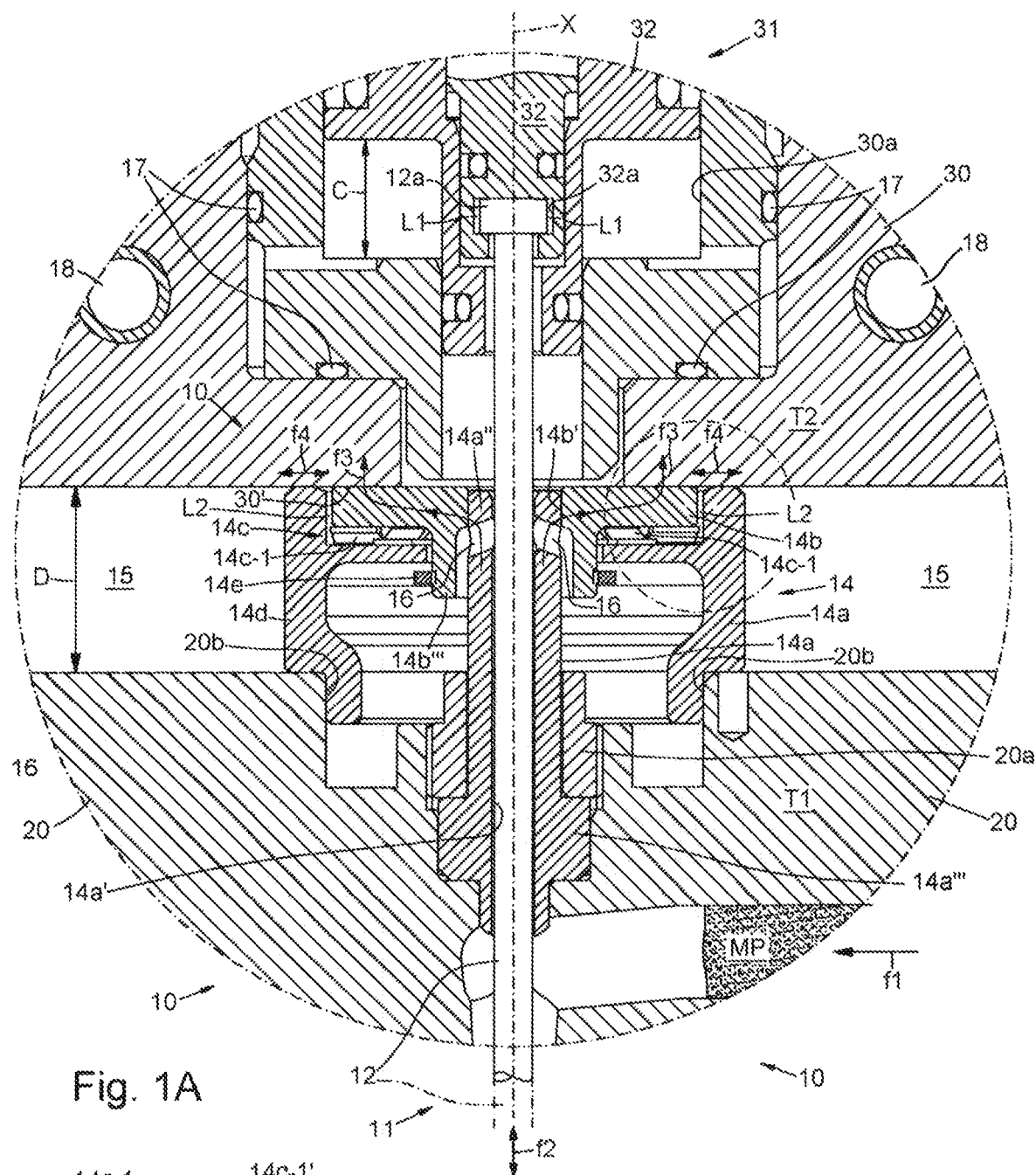
FIG. 1A is a view, in section and in an enlarged scale, of a zone, indicated with a dot-dashed circle in FIG. 1, of the injection unit according to the first embodiment of the disclosure.

With reference to the drawings, an injection unit or group or assembly for the injection moulding of plastic material, having the features of the present disclosure and conforming to a first embodiment thereof, is indicated as a whole by 10.

The injection unit 10 of the disclosure is typically integrated together with other similar injection units or groups 10, into a mould, generally indicated with ST (for example, FIG. 1 shows two of these injection units 10 integrated into the same ST mould) in turn part of a wider moulding system SS, and typically includes:

an injection nozzle 11, extended along a respective axis X and adapted to be fed with a plastic material MP in the molten state, as indicated by an arrow f1; and a closure needle or pin 12, arranged in the injection nozzle 11 and movable axially back and forth along the respective axis X, as indicated by a double arrow f2, between a first operating position in which the closure pin 12 frees and opens an injection hole 13, so as to allow the flow, through it, of the plastic material MP in the molten state towards the cavity of the mould ST, and a second operating position, indicated with a dot-dashed line in FIG. 1, in which the closure pin 12 closes off the injection hole 13, so as to interrupt the flow, through the same injection hole 13, of the plastic material MP towards the cavity of the mould ST.

In the wider moulding system SS, the mould ST and the various injection groups 10, integrated in the same mould ST, are associated with a hot distribution plate 20 and a control plate 30, wherein the hot distribution plate 20, also called "manifold", is suitable to distribute and feed the MP plastic material, in the molten state, to each injection unit 10, that is to the respective injection nozzle 11, to be injected into the mould cavity ST thereby forming and moulding a moulded piece, and wherein the control plate 30, also called "back plate" or "back driving plate", houses the means for commanding and driving the alternating axial motion of the closure pin 12 of each injection unit between the respective open and closed positions.

Both the injection nozzle 11 and the hot distribution plate 20 include suitable heating means, typically constituted by electrical resistances, arranged adjacently to the channels, formed in the injection nozzle 11 and in the hot distribution plate 20, in which channels flows the plastic material MP provided for being injected into the cavity of the mould ST so as to form the moulded piece of plastics.

The control means, indicated as a whole by 31, housed in the control plate 30 and able to control the axial motion of the closure pin 12 of each injection unit 10, consist of an actuator, such as typically a pneumatic or hydraulic cylindrical piston, indicated with 32, axially slidable in a corresponding cylindrical seat 30a formed in the control plate 30, wherein the piston 32 is connected to an upper end or head 12a, of the closure pin 12, opposite to a lower end 12b, of the same closure pin 12, adapted to cooperate with the injection hole 13 to open or close it.

The piston 32 of the control means 31 is designed to be driven by a hydraulic or pneumatic circuit, of known characteristics and therefore not described in detail, so as to slide back and forth in the seat 30a, along a stroke C, and thus control the axial motion of the closure pin 12 between its two operating positions for opening and closing the injection hole 13.

In the operation of the injection assembly 10, the hot distribution plate 20 receives the plastic MP in the molten state from the wider moulding system SS of which the injection unit 10, integrated into the mould ST, is part, and distributes and supplies the plastic material MP to the same injection unit 10, so that it is injected into the cavity of the mould ST.

It follows that, usually, the hot distribution plate 20 is and operates at a temperature significantly higher than that of the control plate 30 which houses the control means 31 of the closure pin 12.

In fact, the control plate 30, in addition to not being subjected directly to the heating by the heat of the plastic material MP in the molten state, whose temperature can reach even hundreds of degrees, is usually cooled, in order to protect the functionality of the control unit 31, and to this purpose can, for instance, comprise within it a cooling circuit indicated by 18 in FIGS. 1 and 1A, along which a cooling fluid flows.

Indicatively, the hot distribution plate 20 operates at a temperature that can reach and exceed 200° C., while the control plate 30, as said usually cooled, operates at a significantly lower temperature, for example of 25° C.

More precisely, the steady-state temperature of the control plate 30 can vary in a range between 20 and 150° C., depending on the type of plastic material used, while that of the hot distribution plate 20 may vary between 160 and 230° C., therefore with a delta or difference of temperature between the two plates which can vary from 160 to 230° C.

It follows that these two plates 20 and 30, in the operation thereof, are subject to thermal expansions and deformations very different from one another, and therefore require to be appropriately constrained reciprocally each other and in the moulding system SS of which they are part, so as to be able to deform freely with respect to each other and thereby not to generate dangerous stresses which could affect the correct operation of the various injection units 10 for injecting the plastic material MP into the mould.

For example, the hot distribution plate 20 can be rigidly constrained in a central point or zone or in an end point or area with respect to the fixed structure of the moulding system SS of which it is part, so as to be free to expand, in the sense of its extension, on two opposite sides or on one side only with respect to the control plate 30.

Of course, the relative expansions of the hot distribution plate 20 with respect to the control plate 30 depend on the length extension of these two plates and, as an indication, may also be of a few tenths of a millimetre.

Furthermore, always in order to prevent dangerous stresses being produced in the injection units 10, the connection between the upper end 12a of the closure pin 12 and the piston 32 is realized by housing this upper end 12a in a respective seat 32a formed in the piston 32, and by providing a suitable light, indicated by L1 in FIGS. 1A and 1B, between the seat 32a and the upper end 12a of the closure pin 12, in a direction normal to the extension axis X of the injection nozzle 11 and of the respective closure pin 12, i.e. in the direction of extension of the control plate 30.

In this way, i.e. thanks to this light L1, in operation of the injection unit 10, as described in detail below, the upper end 12a of the closure pin 12, which follows the thermal expansions of the hot distribution plate 20, at a higher temperature, can freely slide in the respective seat 32a formed in the piston 32, which in turn follows the thermal expansions of the control plate 30, at a lower temperature, without activating dangerous stresses and tensions acting on the closure pin 12, caused by the different temperatures and therefore different thermal expansions of the two distribution and control plates respectively 20 and 30, which could cause an incorrect operation of the injection unit 10.

A plurality of gaskets, indicated with 17, are used, in a known manner, as shown in the drawings, for connecting and sealing the various parts that compose the injection unit 10 and to integrate the same injection unit 10 into the mould ST.

According to an essential characteristic of the present disclosure, the injection unit or assembly 10 comprises a guide and cooling assembly 14, interposed between the control plate 30 and the hot distribution plate 20, wherein this guide and cooling assembly 14 in turn includes:

- a guide element 14a, in particular constituted by a guide bush, defining a guide hole 14a' along which the closure pin 12 extends axially, adapted to guide the same closure pin 12 in the axial motion between the respective first and second operating position to open and close the injection hole 13;
- a cooling element 14b, in particular in the form of a ring, and therefore also called cooling ring, having a central hole 14b' in which an end portion of the guide bush 14a is inserted, so as to couple the cooling ring 14b and the guide bush 14a with each other; and
- pressure means, generally indicated with 14c, designed to press the cooling ring 14b directly against and in contact with a flat surface 30' of the control plate 30.

The guide hole 14a', defined by the guide bush 14a, in addition to the guiding function for guiding the closure pin 12 in its axial motion between the respective first and second operating positions, has also a sealing function against leakage to the outside of the plastics MP, in the molten state, distributed and supplied by the hot distribution plate 20, as will be clearly understood in the following description, whereby the guide bush 14a will also be called guide and seal bush.

For this purpose, the radial clearance in the guide region of the bush 14a, between the respective guide hole 14a' and the closure pin 12, is very small, and for example of the order of 0.002-0.006 mm.

In particular, in this first embodiment 10 of the injection unit of the disclosure, these pressure means 14c are constituted by a metal elastic spring 14c-1, exhibiting a ring-like shape, as described in more detail later.

The guide and seal bush 14a has an elongated shape along the X axis of the closure pin 12, and an upper end portion, indicated with 14a", which is slidably housed in the central hole 14b' formed in the cooling ring 14b, so as to couple in sliding manner the guide and seal bush 14a and the cooling ring 14.

This sliding coupling, along the X axis of the closure pin 12, between the upper portion 14a of the guide bush 14a and the central hole 14b' of the cooling ring 14b, allows an easy assembly of the injection unit 10 with the control plate 30, and furthermore ensures a perfect contact of the cooling ring 14b, subject to the action along the axis X of the spring 14c-1 of the pressure means 14c, against the surface of the control plate 30.

Moreover, the sliding coupling between the upper portion 14a" of the guide and seal bush 14a and the cooling ring 14b advantageously allows these two parts to slide relatively to each other along the axis X, so as to recover and compensate for the thermal expansions and therefore avoid that dangerous tensions are generated in the operation of the injection unit 10, as described hereinafter.

The guide and seal bush 14a is rigidly fixed, at its lower end 14a''', opposite its upper end 14a" slidingly coupled with the central hole 14b' of the cooling ring 14b, to the hot distribution plate 20, adjacent to a region in which the injection nozzle 11 receives the plastic material MP, in the molten state, supplied by the hot distribution plate 20.

In particular, the lower end 14a''' of the guide and seal bush 14a is fixed and rigidly locked in the hot distribution plate 20 by a threaded sleeve 20a which is screwed into the body of the hot distribution plate 20.

Therefore, the guide and seal bush 14a, being securely fixed to the hot distribution plate 20, is suitable to follow, in the operation of the moulding system SS, or of the injection unit 10, the thermal expansions of the same hot distribution plate 20, in particular in the direction of extension of the latter, hence in a direction which is normal to the axis X of the injection nozzle 11 and of the closure pin 12.

A plurality of holes or openings, indicated with 16, are made in the upper end 14a of the guide and seal bush 14a, having the function to allow venting of the gas that is formed, due to the high temperatures reached in the injection nozzle 11 during operation of the injection unit 10.

The cooling ring 14b, included in the guide and cooling unit 14, has a flat upper face 14b which cooperates, along a respective flat annular portion and under the pressure exerted by the spring 14c-1 of the pressure means 14c on the cooling ring 14b, in contact with the flat surface 30' of the control plate 30, in order to transmit the heat that the cooling ring 14b receives from the guide and seal bush 14a, at a higher temperature, to the control plate 30, at a lower temperature.

Advantageously, as can be seen from the drawings, although only indicative of the actual and real dimensions, the flat annular portion of the flat upper face 14b" of the cooling ring 14b, in direct contact with the flat surface 30' of the control plate 30, corresponds to a significant part of the total surface of the flat upper face 14b" of the cooling ring 14b, in order to make more efficacious and improve the transmission of heat from the cooling ring 14b to the control plate 30, during operation of the injection unit 10, as described further on.

For example, the outer diameter, indicated by D1, and the internal diameter, indicated by D1', as shown in FIG. 1B, of the annular portion of the upper flat face 14b" of the cooling ring 14b, in contact with the control plate 30, can be established and defined in ratio to one another in such a way that the annular portion is at least higher than the half of the surface of the entire circular face 14b" of the cooling ring 14b.

Figure 1C:
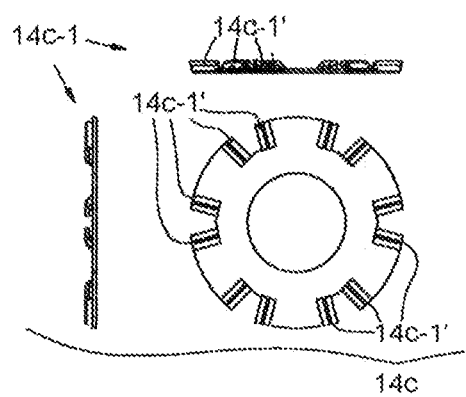
FIG. 1C is a view, in an enlarged scale and from different points of view, of a detail of the injection unit of the disclosure of FIG. 1.

FIG. 1C shows in detail the spring 14c-1, constituting the pressure means 14c, which presses the cooling ring 14b of the guide and cooling assembly 14 against the control plate 30.

As can be seen from this FIG. 1C, the spring 14c-1 has a special ring shape characterized by a plurality of petals or fingers which define a series of protruding radial tabs or fins, indicated with 14c-1', along a face of the spring 14c-1.

These radial fins 14c-1' are adapted to apply a predetermined force on the cooling ring 14b, in any case such as to allow a relative sliding between the same cooling ring 14b and the control plate 30, along the flat surface 30', due to the different operating temperatures and therefore the different thermal expansions of the hot distribution plate 20, at a higher temperature, with respect to those of the control plate 30, at a lower temperature, in the operation of the injection unit 10, as further described in detail.

The spring 14c-1 is dimensioned so as to apply a force of some tens of N (Newton) to press the cooling ring 14b against the control plate 30, and in particular, in order to obtain the best performances, as resulted from careful tests carried out, a force value of about 90 N.

Therefore, in summary, in this first embodiment 10 of the injection unit of the disclosure, the cooling ring 14b, included in the guide and cooling assembly 14, is pressed directly against the control plate 30 by the spring 14c-1 of the pressure means 14c, and is adapted to receive and transmit heat from the upper portion 14a of the guide and seal bush 14a, at a higher temperature, which is slidably coupled with the hole 14b' of the cooling ring 14b, to the control or driving plate 30, at a lower temperature.

In this way the cooling ring 14b is suitable for cooling or at least limiting the temperature in the region of the guide and seal bush 14a, so as to avoid that high temperatures in this zone reduce the sealing capacity of the same guide and seal bush 14a and thus be at the origin of leakage, along the respective hole 14a' in which the closure pin 12 runs axially, of the plastic material MP, in the molten state, which is supplied by the hot distribution plate 20 to the injection nozzle 11.

In this first embodiment 10 of the injection unit of the disclosure, the respective guide and cooling assembly 14 includes, in addition to the parts and elements already mentioned, a further element, however not essential and therefore not present in other embodiments of the disclosure described below, consisting of:

a hollow outer body 14d, interposed and pressed between the control plate 30 and the hot distribution plate 20, so as to distance them and define a separation space 15 between them.

In particular, this hollow outer body 14d, defining the separation space 15, is configured in such a way as to allow the control plate 30 and the hot distribution plate 20 to thermally deform relative to one another, without being rigidly constrained and connected each other, so as to avoid dangerous stresses arising in the injection unit 10 during its operation.

To this purpose the hollow outer body 14d is rigidly fixed, at one end, in a respective seat 20b formed in the hot distribution plate 20 so as to be integral with the latter and follow the respective thermal deformations, and has, at the opposite end, a flat annular surface 14d" which cooperates in contact with a flat surface, of the control plate 30, which corresponds to and is the same flat surface 30' with which the cooling ring 14b cooperates in contact, as clearly shown in FIG. 1B.

Therefore, in the operation of the injection unit 10, as described in detail below, when the control plate 30 and the hot distribution plate 20 are subjected to different thermal deformations, due to the respective different operating temperatures, the hollow outer body 14d of the guide and cooling assembly 14 follows the thermal deformations of the hot distribution plate 20 and slides with the flat annular surface 14d" on the corresponding flat surface 30' of the control plate 30, whereby the hot distribution plate 20 and the control plate 30 can freely deform thermally relative to each other without activating dangerous stresses in the injection unit 10.

For the sake of completeness, it should be noted that the force, which keeps the control plate 30 pressed against the hot distribution plate 20 and which is supported and contrasted by the hollow outer body 14d, is of course proportional to the number of nozzles and therefore of the injection units 10 which are interposed between the two plates 20 and 30 and therefore operate as spacing and contrast elements therebetween.

Indicatively this force, which must be sufficient to guarantee the seal between the nozzle and the two plates 20 and 30 in the operation of the moulding system, is established so as to correspond to an interference or hot penetration of the hollow outer body 14d, i.e. with the latter hot, of about 0.05 mm, in the control plate 30, whereas it should be yielding, whereby this force can assume, being the outer body 14d of steel, values of some tens of KN, in function of course of the nozzle size.

Therefore, in this first embodiment 10 of the injection unit or assembly of the disclosure, the guide and cooling assembly 14, which includes the hollow outer body 14d and is interposed between the control plate 30, which houses the control means 31 controlling the axial motion of the closure pin 12, and the hot distribution plate 20, which feeds the plastic material MP in the molten state to the same injection unit 10, has also the function, in addition to that of guiding the closure pin 12 in its axial motion and to transmit the heat from the region of the guide and seal bush 14a to the control plate 30, of spacing the hot distribution plate 20 from the control plate 30, so as to define an interspace or separation space, as said indicated with 15 and defined by a determined distance D, between them, adapted to allow the two plates 20 and 30 to thermally expanding one with respect to the other in the operation of the moulding system SS and therefore of the injection unit 10.

In detail, in this first embodiment 10 of the injection unit of the disclosure in which the respective guide and cooling assembly 14 includes the hollow outer body 14d, the cooling ring 14b is retained in a respective seat 14d', formed in the hollow body 14d, by means of a snap ring type or "Seeger" type ring 14e which cooperates with an annular projection 14d''' which is formed inside the outer hollow body 14d and acts as a supporting base for the spring 14c-1.

Furthermore, advantageously, the guide and cooling assembly 14, included in the injection unit 10, in turn including the hollow outer body 14d, is configured so as to recover any centering errors and in general any constructional inaccuracies during the assembly of the moulding system comprising the hot distribution plate 20 and the control plate 30.

For this purpose, for example, the cooling ring 14b, pressed by the spring 14c against the control plate 30, has, as shown in FIG. 1B, an outer diameter D1 slightly lower than that D2 of the respective cylindrical seat 14d', formed in the hollow outer body 14d of the guide and cooling unit 14, in which the cooling ring 14b is housed, so as to define a radial light, indicated by L2, between the diameter 01 of the cooling ring 14*b* and the diameter 02 of the respective seat 14*d'*, adapted to allow the cooling ring 14*b* and the hollow body 14*d* to recover and compensate for any constructive centering errors, in the assembly of the moulding system formed by the hot distribution plate 20 and by the control plate 30.

A similar L2 light, always aimed at allowing the cooling ring 14*b* and the hollow body 14*d* to recover possible constructive centering errors in the assembly of the moulding system formed by the hot distribution plate 20 and by the control plate 30, is also defined, as shown in FIG. 1B, between the annular projection 14*d'''*, which acts as a support for the springs 14*c*-1, of the hollow outer body 14*d*, and a portion 14*b'''*, shaped like a sleeve, extended along the X axis of the cooling ring 14*b*.

The operation of the injection unit 10, in accordance with this first embodiment of the disclosure, will now be described in detail, so as to further highlight its innovative characteristics.

In a normal injection moulding cycle performed by the injection unit 10, the melted plastic MP is fed from the hot distribution plate 20 to the injection nozzle 11 of the injection unit 10, as indicated by an arrow f1.

When the closure pin 12, axially movable forward and backward along the respective axis X, as indicated by a double arrow f2, opens the injection hole 13, the plastic material MP in the molten state is injected into the cavity of the mould ST, thus forming and moulding a piece of plastic.

Therefore, as already explained, during the moulding cycle of the plastic piece, the hot distribution plate 20, since being crossed along its inner channels by the plastic material MP, in the molten state, which feeds the injection nozzle 11, is usually at a temperature T1 considerably higher than the temperature T2 that is present in the control plate 30 which is not crossed by the plastic material MP in the molten state.

In this operating context, the guide and cooling assembly 14 operates effectively, through the respective cooling ring 14*b* in direct contact with the control plate 30 under the pressure exerted by the pressure means 14*c*, to directly evacuate the heat from the portion of the portion upper end 14*a''* of the guide and seal bush 14*a*, which is at a higher temperature due to the heat received from the hot distribution plate 20, to the region of the control plate 30, which is at a lower temperature, as schematised by flow lines f3, so as to avoid that in the region of the guide and seal bush 14*a* there is present an excessive temperature which could be the cause of losses and leakages along the hole 14*a'* of the same guide and seal bush 14*a* in which the closure pin 12 extends, of the molten plastic material MP fed to the injection nozzle 11 by the hot distribution plate 20.

In fact, as it has also been experimentally verified, thanks to this configuration of the guide and cooling assembly 14, the temperature in the region of the guide and seal bush 14*a*, included in the guide and cooling assembly 14, is advantageously kept below a critical threshold, so as to avoid that the temperature of the plastic material MP, supplied by the hot distribution plate 20, which circulates adjacent to the guide and seal bush 14*a*, becomes excessive and therefore makes the plastic material MP too fluid and consequently capable of seeping outside of the injection nozzle 11 along the hole 14*a'*, of the guide and seal bush 14*a*, in which the closure pin 12 slides.

In particular, as resulted from the experimental tests, the guide and cooling assembly 14 of the invention, due to the effect of this efficient heat transmission and of the thermal bridge function carried out by the respective cooling ring 14*d*, allows to lower in a substantial way the temperature in the region of the guide and seal bush 14*a*, for example indicatively of about 60° C., with respect to the temperature that there would occur in the same area in the absence of this guide and cooling assembly 14.

Furthermore, the sliding coupling between the cooling ring 14*b*, subjected to the pressure of the pressure means 14*c*, and the surface 30' of the control plate 30, with which the cooling ring 14*b* cooperates in contact for transmitting heat from the guide and seal bush 14*a*, as well as the sliding coupling between the hollow body 14*d* and such surface 30', allows to efficiently recover the different thermal expansions of the hot distribution plate 20, at the highest temperature T1, and of the control plate 30, at the lowest temperature T2, as indicated by double arrows f4.

Therefore, as already anticipated, in the operation of the injection unit 10, these two plates 20 and 30 can expand and deform freely relative to each other without causing, as a consequence of these different thermal expansion, dangerous stresses and tensions acting in the same injection unit 10, and in particular on the closure pin 12, which tensions could create resistances in the axial motion of the closure pin 12 and therefore do not allow a correct operation of the injection assembly 10 to inject the plastic material MP into the mould ST.

Furthermore, the sliding coupling, along the X axis, between the upper portion 14*a* of the guide and seal bush 14*a* and the central hole 14*b'* of the cooling ring 14*b*, also causes that the guide and seal bush 14*a* and the cooling ring 14*b* are free to deform one another in the operation of the injection unit 10, so as to avoid the occurrence of dangerous stresses and stresses.

It is therefore clear, from the foregoing description, that the present disclosure fully achieves the intended objects, and in particular proposes a new and innovative injection unit or group or assembly including a closure pin, which advantageously solves both the problem of recovering and absorbing the different thermal expansions between a hot distribution plate and a control plate, due to their different operating temperatures, with which the injection unit is associated, so as to avoid the occurrence of dangerous tensions and stresses acting in the injection unit and in particular on the respective closure pin, and the problem of maintaining the temperature in the zone of a guide bush or a similar guide element of the closure pin below a critical threshold, so as to avoid the risk of possible leakage, through this guide bush, of the plastic material in the molten state fed to the injection unit by the hot distribution plate.

Further Embodiments and Variants

Of course, without prejudice to the basic principle and concepts of the present disclosure, the embodiments and details of the injection unit can be widely varied with respect to what has been described and illustrated, without thereby departing from the scope of the same invention.

Figure 2:
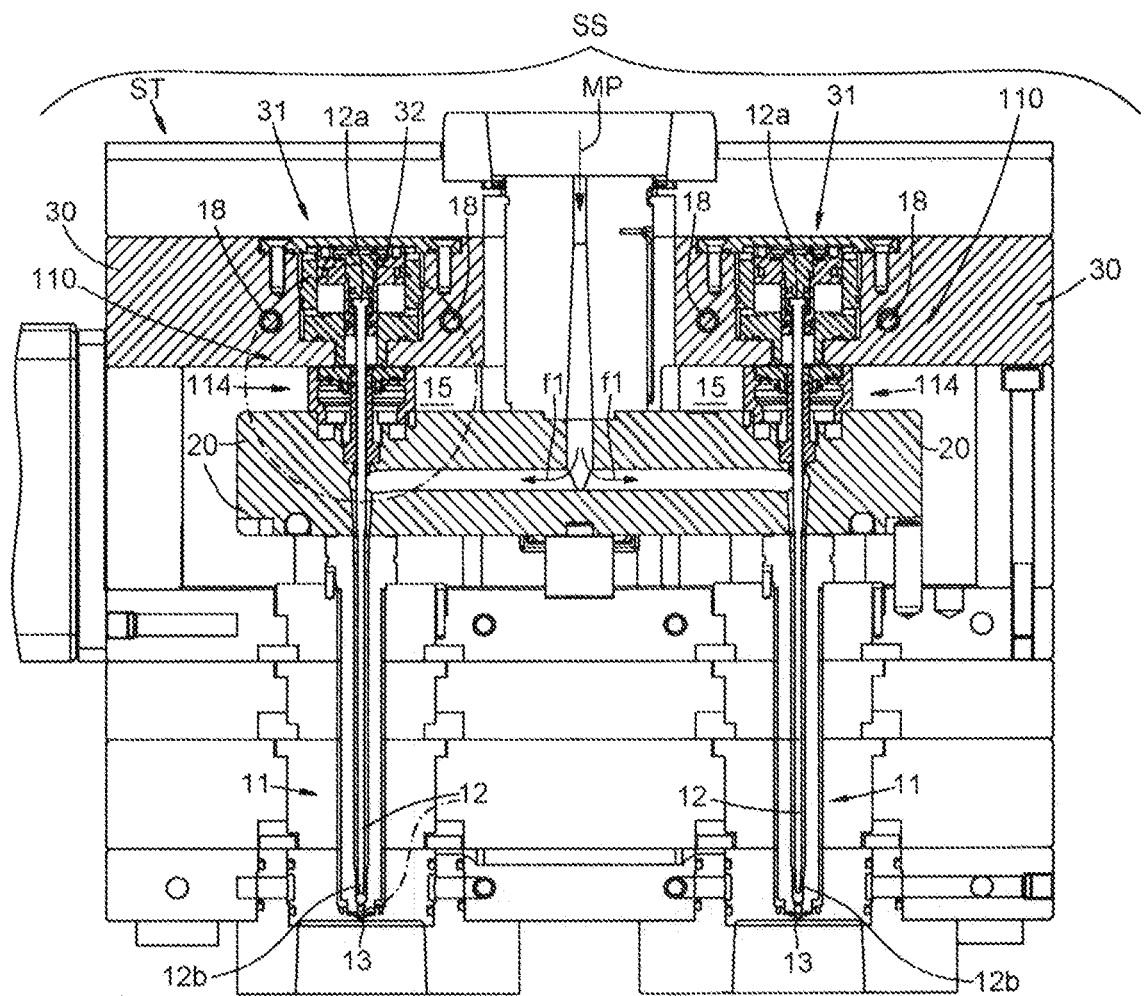
FIG. 2 is a partial and sectional view of a mould which incorporates at least one injection unit, according to the disclosure, for injection moulding of plastic material, according to a second embodiment thereof, again associated with a hot distribution plate and with a back driving plate or control plate, and having the capacity both to recover the different thermal expansions of these two plates and to avoid any leakage of the plastic material to the outside of the injection unit.
Figure 2B:
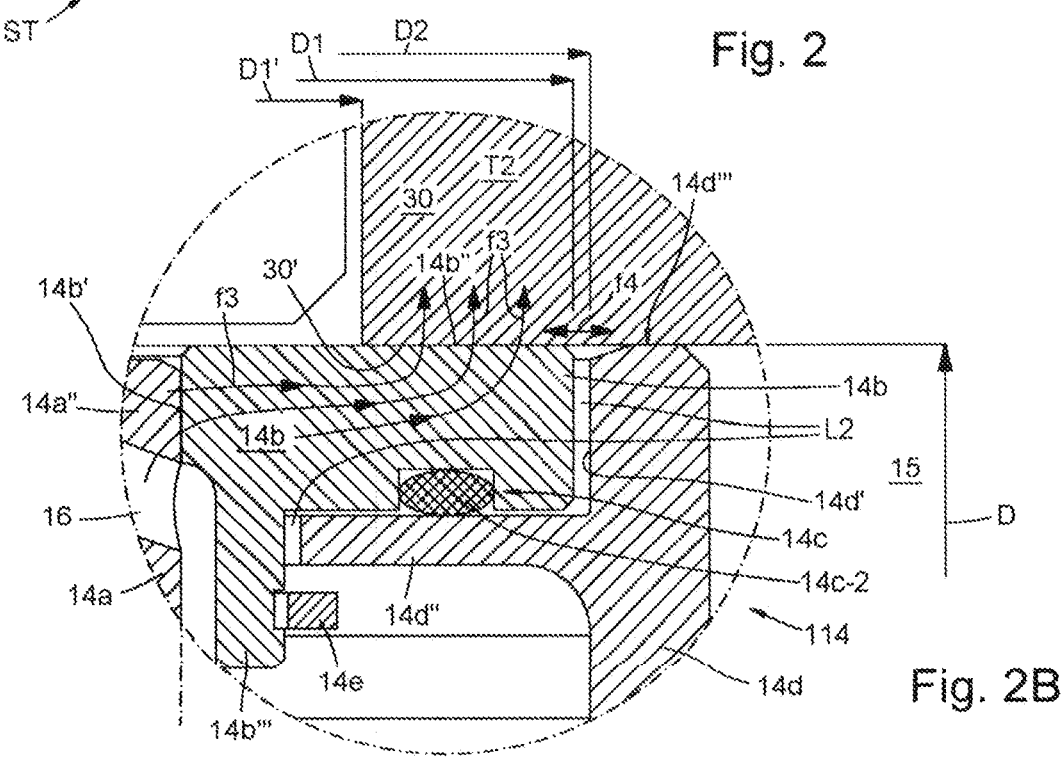
FIG. 2B is a view, in an enlarged scale, of an area indicated with a dashed and dotted circle in FIG. 2A.
Figure 2A:
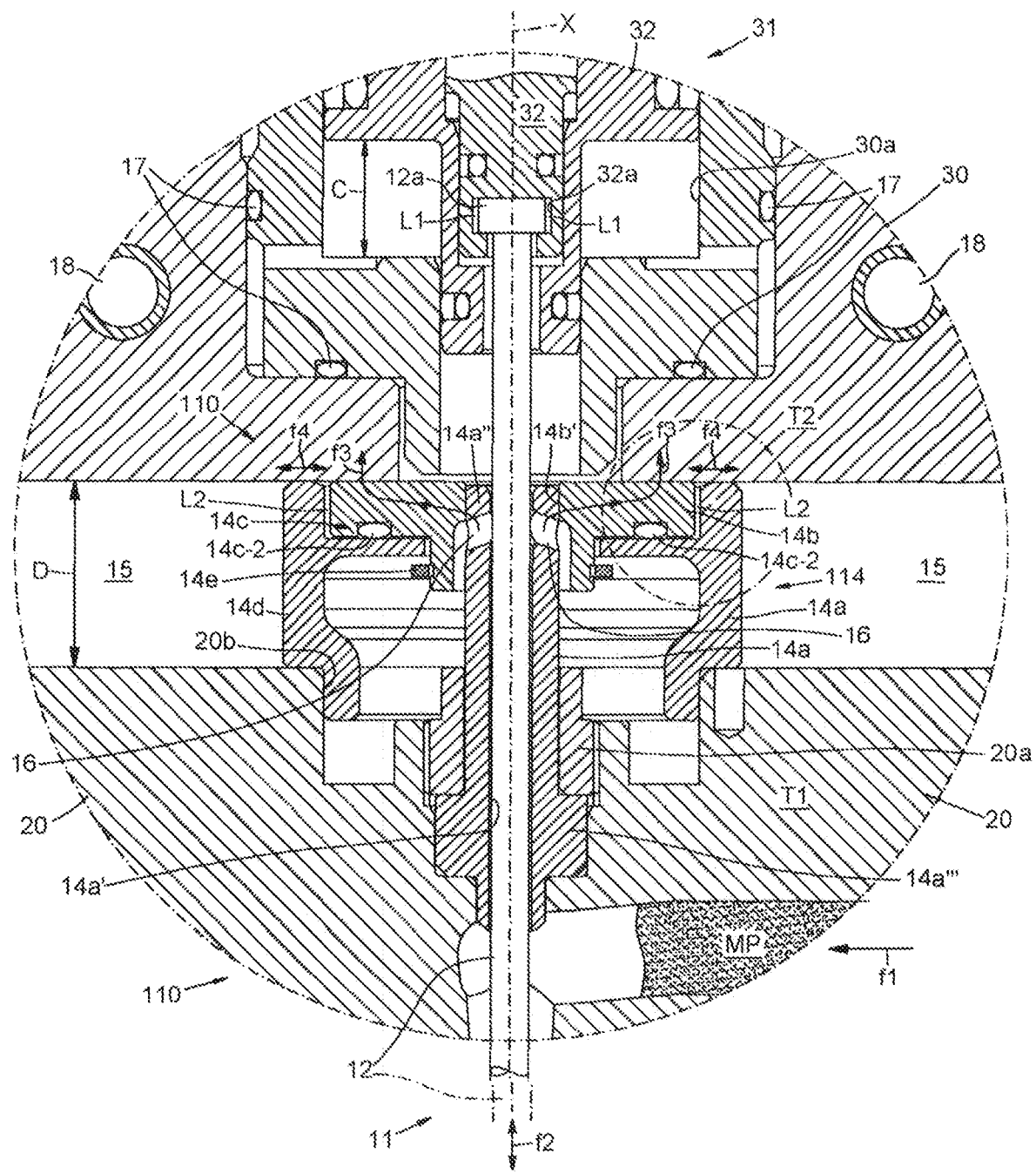
FIG. 2A is a sectional view, in an enlarged scale, of an area, indicated with a dot-dashed circle in FIG. 2, of the injection unit according to the second embodiment of the disclosure.

For example, FIGS. 2, 2A and 2B show a second embodiment, indicated with 110, of the injection unit or assembly of the disclosure, in which, for reasons of clarity and correspondence, the parts identical or similar to those of the first embodiment 10 are indicated with the same numerical references, and the new ones with numerical references increased by 100.

In particular, in this second embodiment 110 of the injection unit of the disclosure, the pressure means 14*c*, included in the guide and cooling unit 114, are constituted, instead of by a metal spring, exhibiting a ring configuration, as in the first embodiment 14, by a sealing ring of the O-ring type.

For the rest, the injection unit 110 does not differ from the injection unit 10, before described, and therefore for reasons of conciseness the description thereof will be omitted.

Figure 3:
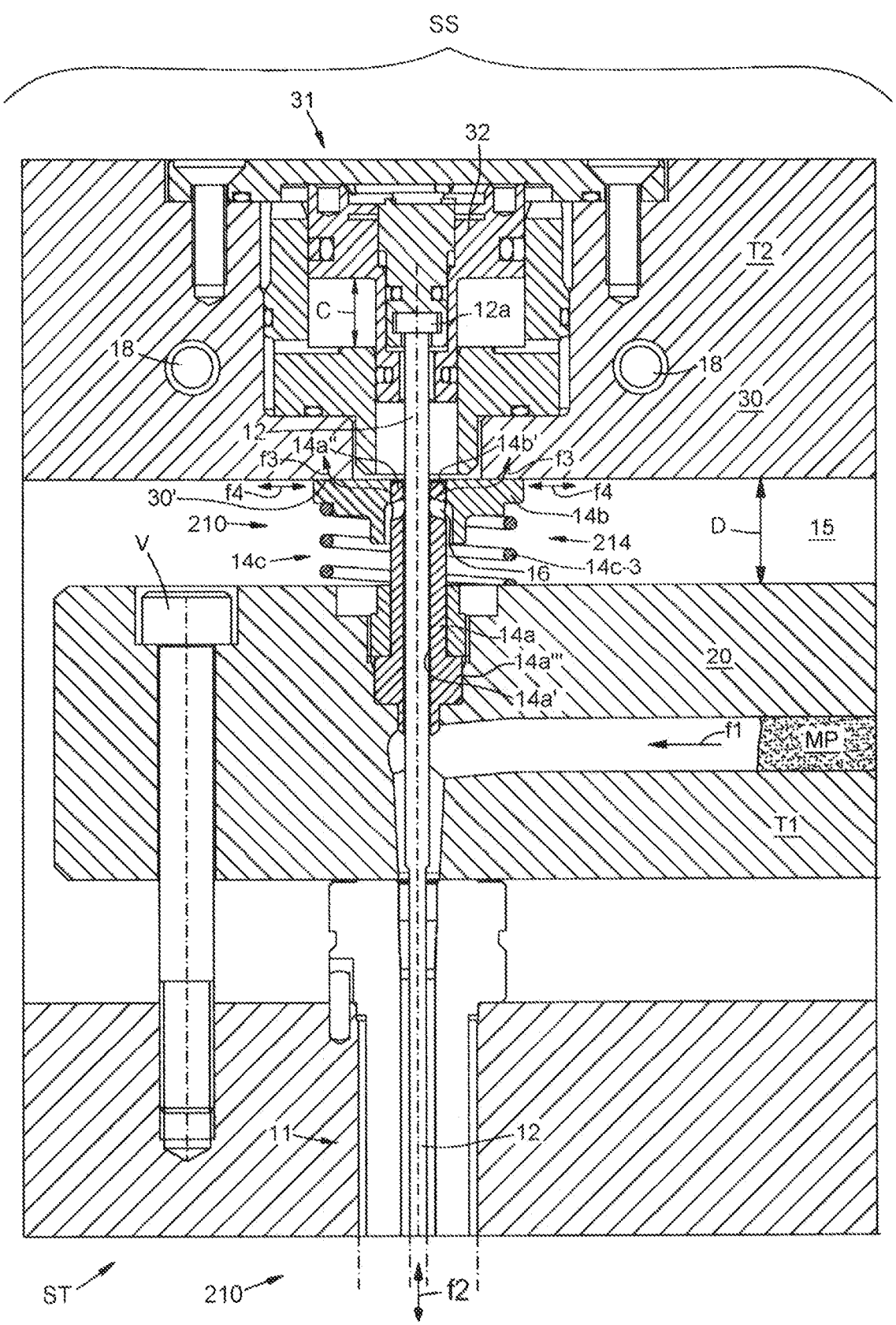
FIG. 3 is a partial and sectional view of a mould which incorporates a third, simplified embodiment of the injection unit of the disclosure for injection moulding of plastic material, associated with a hot distribution plate and with a control plate, and having the capacity both to recover the different thermal expansions of these two plates and to avoid any leakage of the plastic material to the outside of the injection unit.

Still FIG. 3 shows a third preferred embodiment, indicated by 210, of the injection unit of the disclosure, comprising a guide and cooling assembly 214 exhibiting a simplified configuration with respect to that of the guide and cooling assemblies 14 and 114, respectively included in the first and second embodiments 10 and 110 of the injection unit of the disclosure for injection moulding of plastic material.

Similar to the previous first and second embodiments 10 and 110, described above, the injection unit 210, according to this third embodiment 210, is interposed and associated with a hot distribution plate 20 and with a control plate 30, and has the capacity both to recover the different thermal expansions of these two plates, and to avoid any leakage of the plastic material to the outside of the injection unit.

However, as already mentioned, the injection unit 210 does not comprise, unlike the embodiments 10 and 110, the hollow outer body, included in the guide and cooling unit, which acts as a separating element and spacer between the hot distribution plate 20 and the control plate 30, and defines the distance D which separates them.

In particular, as shown in FIG. 3, the pressure means 14c, included in the guide and cooling assembly 214, which press the cooling ring 14b against the control plate 30, are constituted by a helical compression spring indicated with 14c-3.

Also in this embodiment 210, similarly to the embodiment 10, the spring 14c-3 is dimensioned so as to apply a force of some tens of N (Newton) to press the cooling ring 14b against the control plate 30, and in particular, in order to achieve the optimal results, as was shown by tests carried out, a force value of about 90 N.

Therefore, in this embodiment 210, the injection unit of the disclosure, even if it is interposed between the hot distribution plate 20 and the control plate 30, and although the two plates 20 and 30 are mutually spaced by a gap of width D so that they can thermally expand one with respect to the other in their operation, does not receive and consequently does not support and oppose the clamping force which clamps the two plates 20 and 30 together.

It also follows that, in this third embodiment 210 of the injection unit of the disclosure, the hot distribution plate 20 and the control plate 30 are separated from one another by other parts and elements, distinct from the injection assembly 210, included in the wider moulding system in which the injection assembly 210 is integrated.

For example, as shown in FIG. 3, the hot distribution plate 20 and the control plate 30 can be separated one from the other by the gap of width D, instead of by the guide and cooling assembly 214 included in the injection unit 210, by other distinct constraints separated from such guide and cooling assembly 214, or in general by the way in which these two plates 20 and 30 are constrained to other parts of the moulding system SS in which they are integrated.

In particular, purely by way of example, FIG. 3 shows a configuration of the moulding system SS which integrates the injection unit or assembly 210, wherein the hot distribution plate 20, associated with the same injection unit 210, is constrained to one end, by means of a bolt or screw V, to the fixed structure of the moulding system SS, and wherein this screw V is housed in a respective seat, formed in the hot plate 20, configured so as to allow the latter to dilate and deform freely, so as not to generate dangerous tensions in the effective operation of the injection unit 214.

Figure 3A:
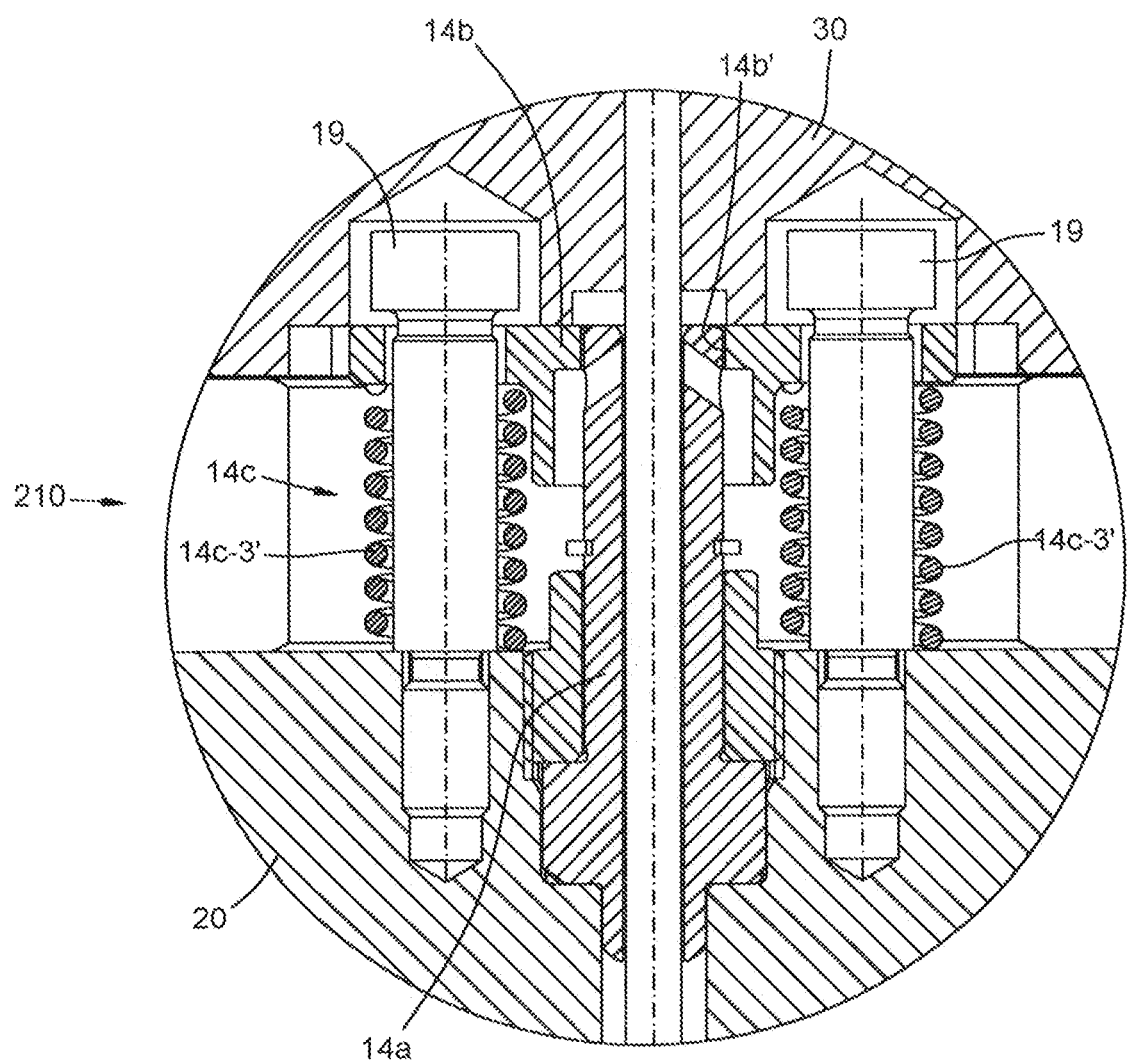
FIG. 3A in turn shows a variant of the third simplified embodiment of FIG. 3.

FIG. 3A in turn shows a variant of the configuration of the pressure means 14c which, in the third simplified embodiment 210, are included in the guide and cooling assembly 214 for pressing the cooling ring 14b against the control plate 30, wherein in this variant the pressure means 14c are constituted instead of by a single spring by two or more helical compression springs, indicated with 14c-3', each mounted around a respective screw 19 fixed to the hot plate 20.

It is noted that in this variant the screws 19 constitute a not essential element and simply have the function of retaining the springs 14c-3' in position and facilitating their assembly.

Again, within the scope of the inventive concept of the present disclosure, other configurations of the guide and cooling assembly, in addition to or as an alternative to those 14, 114, 214 described above, are possible, in order to allow the injection unit, in which the guide and cooling assembly is integrated, both to recover the different thermal expansions of the hot distribution plate 20 and the control plate 30, in the operation thereof, as well to avoid or at least to limit leakage of the plastic material in the molten state to the outside of the injection unit.

The invention claimed is:

1. An injection unit for injection moulding of plastic material, associated, in a moulding system, with a hot distribution plate and a back driving plate, comprising:
   an injection nozzle;
   a closure pin axially movable, in the injection nozzle, between a first operating position in which the closure pin frees and opens an injection hole so as to allow a flow through the injection hole of the plastic material in the molten state towards a mould, and a second operating position in which the closure pin closes the injection hole, so as to interrupt the flow through the injection hole of the plastic material towards the mould; and
   a guide and cooling assembly, interposed between the back driving plate and the hot distribution plate;
   wherein the hot distribution plate is adapted to distribute and feed the molten plastic material to the injection nozzle in order to be injected into the mould, and the back driving plate houses the driving means for driving an axial motion of the closure pin between the first and second operating positions;
   wherein the guide and cooling assembly comprises:
   a guide and seal element in the form of a bush defining a guide hole along which the closure pin extends axially, the guide hole having both a guiding function to guide the axial motion of the closure pin between the first and second operating positions, and a sealing function against leakage at an outside of the plastic material in the molten state and distributed and supplied by the hot distribution plate;
   a cooling ring; and
   a pressure means in the form of an elastic spring or an 0-ring type ring configured to press the cooling ring directly against and in contact with the back driving plate;
   in that the guide and seal element is slidably coupled at an end with a central hole of the cooling ring and is fixedly attached at the other end to the hot distribution plate; and in that the cooling ring, pressed by the pressure means against the back driving plate, is adapted, in operation of the injection unit:
to slide laterally with respect to the back driving plate because of the different operating temperatures and hence of the different thermal expansions of the hot distribution plate, at a higher temperature, and the back driving plate, at a lower temperature, so as to recover this difference in thermal expansion between the back driving plate and the hot distribution plate and thereby avoid creating dangerous stresses acting on the injection nozzle and on the closure pin; and
to efficiently evacuate and transmit heat from at least one portion of the guide and seal element to the back driving plate, so as to avoid that high temperatures are reached in a region of the guide and seal element at an origin of leakage, at an outside of the injection nozzle, of the plastic material in the molten state.

2. The injection unit for injection moulding of plastic material according to claim 1, wherein the guide and cooling assembly further comprises:
an outer hollow body housing the cooling ring, the outer hollow body being interposed and pressed between the back driving plate and the hot distribution plate so as to distance and define a given separation space between them, and being able to allow the hot distribution plate and the back driving plate to thermally deform one relatively to the other without being rigidly constrained, so as to avoid raising of dangerous stresses in the injection unit during operation,
whereby the guide and cooling assembly, including the outer hollow body, also acts as a spacer element for spacing and separating the back driving plate and the hot distribution plate between them with the given separation space.

3. The injection unit for injection moulding of plastic material according to claim 2, wherein the cooling ring pressed by the pressure means against the back driving plate has a diameter smaller than that of a cylindrical seat, formed in the outer hollow body, in which the cooling ring is housed, so as to define a radial light between the diameter of the cooling ring and the diameter of the respective seat formed in the outer hollow body, the radial light being suitable for allowing recovery of any possible centering errors during an assembly phase of the moulding system including the hot distribution plate, the back driving plate, and the injection unit or units interposed between the back driving plate and the hot distribution plate.

4. The injection unit for injection moulding of plastic material according to claim 1, wherein the cooling ring has a flat top face cooperating, along a respective flat annular portion and under an action of the pressure means on the cooling ring, with a corresponding flat surface of the back driving plate in order to transmit to the latter the heat that the cooling ring receives from the guide and seal element;
wherein the flat annular portion of the flat top face of the cooling ring in direct contact with the flat surface of the back driving plate corresponds to a relevant part of a total area of the flat top face of the cooling ring in order to make more effective and improve heat transmission from the guide and seal element to the back driving plate during the operation of the injection unit.

5. The injection unit for injection moulding of plastic material according to claim 1, wherein the pressure means comprises a metal elastic spring of a ring type or a helical compression type.

6. The injection unit for injection moulding of plastic material according to claim 1, wherein the pressure means comprises an O-ring type sealing ring.

7. An injection unit for injection moulding of plastic material according to claim 1, wherein the closure pin has an upper end which is housed with a certain light in a respective seat which is formed in a driving means, housed in the back driving plate, which drive the axial motion of the closure pin, and is formed in a piston of the driving means, so as to allow the hot distribution plate and the back driving plate to deform and expand thermally relatively one to the other without producing dangerous stresses in the injection unit during operation.

8. A mould for injection molding of the plastic material, comprising one or more injection units according to claim 1.

9. An injection moulding system for injection moulding of the plastic material, comprising a mould according to claim 8.

* * * * *